No. 766,771. PATENTED AUG. 2, 1904.
S. O. RICHARDSON, Jr.
PROCESS OF MANUFACTURING GLASS.
APPLICATION FILED JUNE 24, 1904.
NO MODEL. 2 SHEETS—SHEET 1.

Witnesses:
J. B. Weir
Emil E. Dettmann

Inventor
S. O. Richardson Jr.
By Raymond & Barnett
Attys

No. 766,771. PATENTED AUG. 2, 1904.
S. O. RICHARDSON, Jr.
PROCESS OF MANUFACTURING GLASS.
APPLICATION FILED JUNE 24, 1904.
NO MODEL. 2 SHEETS—SHEET 2.

Witnesses:
J. B. Weir
Emil E. Dettmann

Inventor:
S. O. Richardson Jr.
By Raymond & Catlett Attys

No. 766,771.

Patented August 2, 1904.

UNITED STATES PATENT OFFICE.

SOLON OSMOND RICHARDSON, JR., OF TOLEDO, OHIO.

PROCESS OF MANUFACTURING GLASS.

SPECIFICATION forming part of Letters Patent No. 766,771, dated August 2, 1904.

Application filed June 24, 1904. Serial No. 213,953. (No model.)

*To all whom it may concern:*

Be it known that I, SOLON OSMOND RICHARDSON, Jr., a citizen of the United States, residing at Toledo, in the county of Lucas and State of Ohio, have invented certain new and useful Improvements in Processes of Manufacturing Glass, of which the following is a specification.

My invention relates more particularly to the manufacture of high-quality glass—such, for example, as lead glass—in the manufacture of which it is essential for the best results that the batch and the glass shall be protected from the action of the reducing flames and gases during the melting or reducing and the plaining or refining stages.

The object of my invention is to provide a continuous process for manufacturing glass without exposing the same to direct contact with the reducing flames and gases during the reducing and plaining stages. This and such other objects as may hereinafter appear are attained by the process hereinafter described, which process may be conveniently practiced with the apparatus shown diagrammatically in the accompanying drawings, in which—

Figure 1:
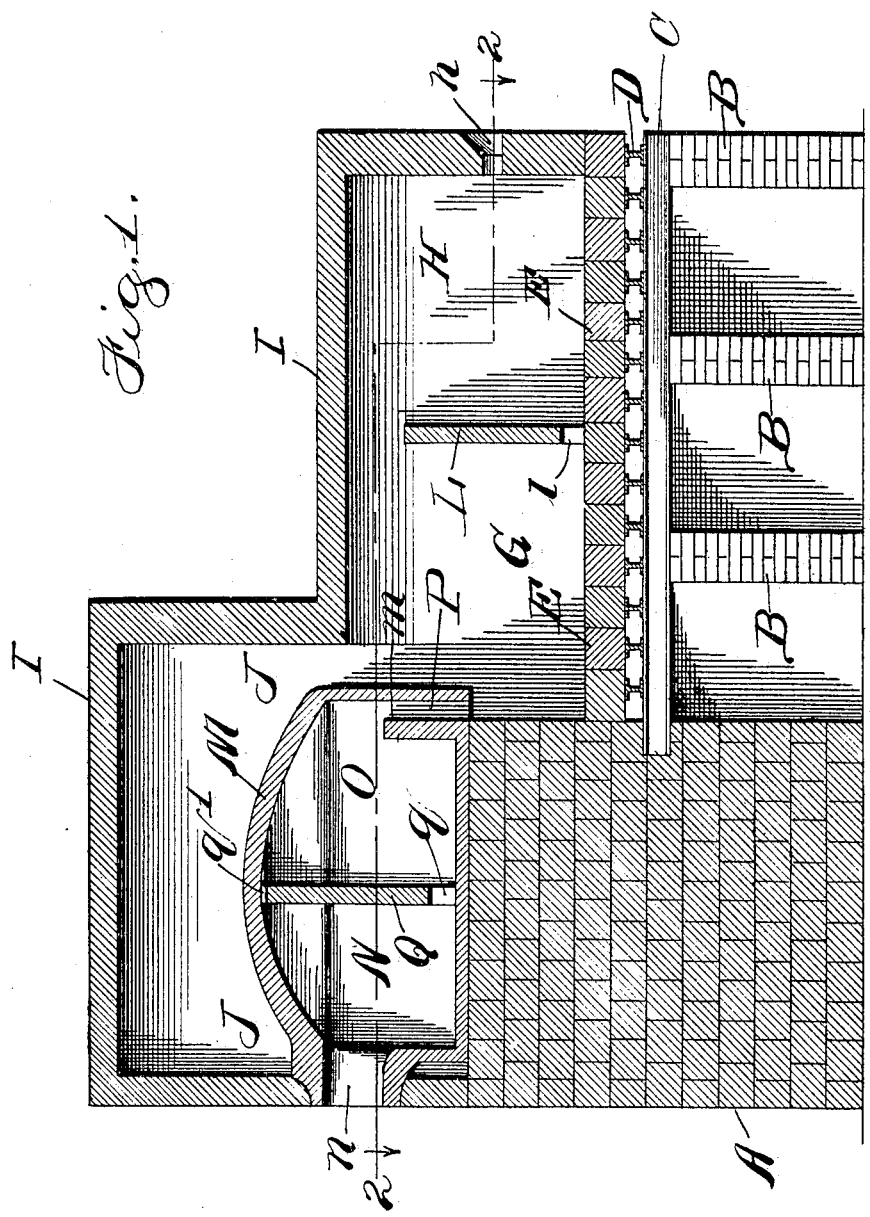
Figure 2:
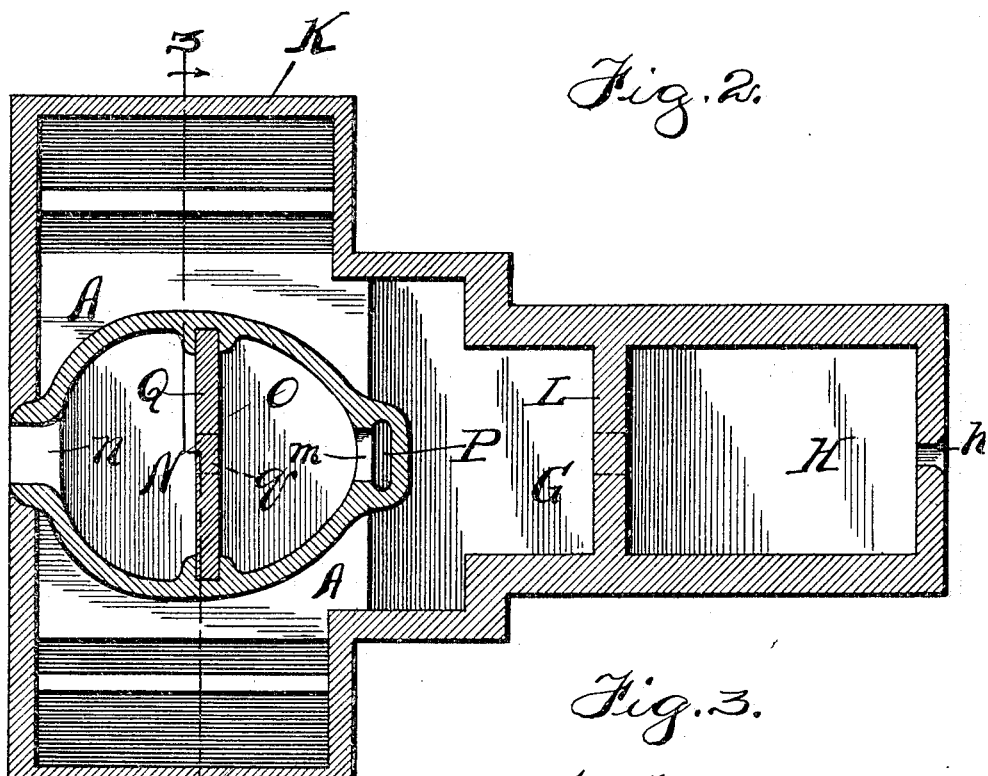
Figure 3:
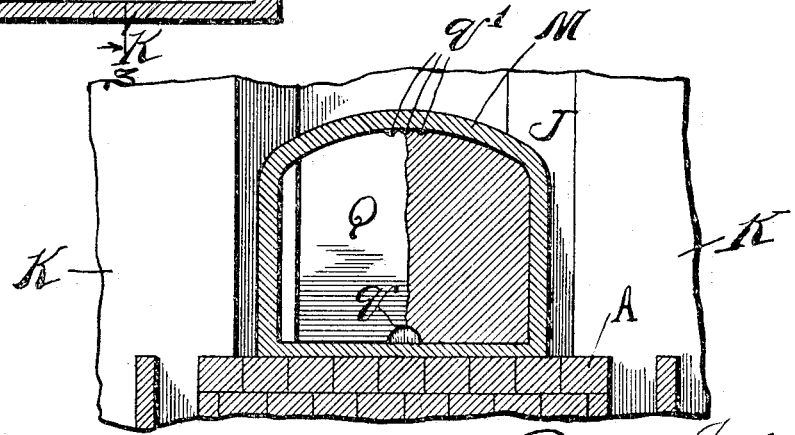

Figure 1 is a longitudinal section of a furnace embodying my invention. Fig. 2 is a sectional plan view thereof on the line 2 2 of Fig. 1 looking in the direction indicated by the arrows, and Fig. 3 is a sectional detail on the line 3 3 of Fig. 2 looking in the direction indicated by the arrows.

Like letters of reference indicate the same parts in the several figures of the drawings.

Referring by letter to the accompanying drawings, A is the bench supporting the molding-pot.

B B are piers supporting I-beams C, across which other I-beams D are arranged in a familiar manner, said I-beams D supporting the blocks E, which form the bottom of the working chamber or tank.

F is the crown over the plaining and settling chamber G and working chamber H.

I is the crown over the flameway or heating-chamber J.

K K indicate the regenerators of any familiar type.

L is a bridge-wall separating the plaining-chamber G from the working chamber H and provided with a passage between said chambers near the bottom of said wall.

$h$ is the working opening, the bottom of which is on a plane coincident with or below the top of the bench A.

M is the melting-pot, comprising a melting-chamber N, a plaining-chamber O, and a metal-conduit P. Arranged transversely of the pot M is a partition Q, provided, preferably at the lower edge thereof, with a passageway $q$. The partition Q may be also provided above the metal-line with vents $q'$, if desired. The melting-chamber N is provided with a feed-opening $n$.

In the practice of my process with an apparatus constructed as shown the batch may be fed into the melting or reducing chamber intermittently or continuously, as may be desired or as may be necessary to maintain a supply of metal in the working chamber, and as the same is reduced the metal, containing gases and other impurities, flows through the passage $q$ into the plaining or refining chamber of the pot, and as the plaining-chamber is filled with the metal the more or less completely refined glass finally overflows the dam $m$ into the chamber G and thence through the passage $l$, under the bridge-wall L, and into the working chamber H, where it passes from the zone of reducing heat and is maintained at a workable temperature, either by the heat radiated from the flameway or heating-chamber J or by means of any convenient supplemental heating means in the working chamber G, or by both together.

As is well known in this art, it ordinarily requires between twenty-five and thirty hours or longer for the production of refined glass from the time the pot is first charged with the batch. In the course of fourteen or fifteen hours under conditions which usually apply the batch is reduced to a molten mass containing a large quantity of unfused particles, and it usually requires the continued action of the reducing heat for six to eight hours longer before the batch is completely reduced—that is, before the entire mass is wholly fused and entirely freed from unfused particles. In this condition the mass is full of bubbles or gases, so that the metal is in no shape to be made into commercial glassware. Accordingly from the time of complete fusion the reducing heat is ordinarily continued for seven to ten hours longer, during which time the gases escape from the glass until the metal becomes entirely clear and free from bubbles. This is the time during which the complete plaining process takes place, and until this plaining is completed no completely-refined glass is produced.

It will be understood that ordinarily in the practice of my process the reduction of the batch, which takes place within the chamber N of the pot, will only be a first crude reduction—that is, such a reduction as will allow the partially-fused mass, containing numerous particles of unfused ingredients in suspension, to pass through the opening $q$ into the chamber O, thus making room in the chamber N for a further supply of the batch of wholly unfused ingredients, the wall Q serving to hold back all of the unfused ingredients which remain on the surface of the fused metal. As soon as this partially-fused metal reaches the chamber O a combined reducing and plaining process takes place, the continued application of the reducing heat on the outside of the pot serving to complete the fusing of the previously unfused particles remaining in the metal, while at the same time a considerable part of the gases held in suspension in the partially-fused metal will escape within the chamber O. Although it is possible to complete the reduction of the batch in the chamber N, the ordinary practice of my process will be as just indicated. In the manufacture of the finer grades of glass the complete reduction of the metal before it leaves the chamber O is much to be preferred, so that the metal flowing into the chamber G will be completely fused.

Owing to the large capacity of the chamber G in proportion to the speed with which the refined metal will be worked out of the working opening $h$, the flow out of the chamber G into the chamber H will be very slow, so that the metal will remain for many hours within the chamber G, during which the refining or plaining process is taking place. As is well known in this art, the finer and purer glass settles toward the bottom of the tank, and so only a fine quality of glass will flow through the passage-way $l$ into the chamber H. It will thus be seen that I combine the advantages of the pot and of the tank-furnace, not only in obtaining pot-made glass by a continuous process, but, inasmuch as it is only necessary for each batch to occupy the pot until it is thoroughly reduced, it can then be caused to flow into the tank or chamber G, where it will have ample opportunity to plain, so I am enabled to recharge each pot more frequently than is possible in the processes now in use, where the metal must remain in the pot not only until it is fused, but until it is completely plained, thus requiring each batch to occupy the pot much longer than is required with my process. Furthermore, with my process I provide a method for reducing the batch in a substantially closed pot in such a manner that the pot may be kept continuously at the same temperature, because as the glass is never worked directly out of the pot the pot need never be allowed to cool, and with the furnace once in operation a constant level of metal may be maintained in the pot, so that the pot is subjected to a practically constant temperature both inside and out. Furthermore, in practicing my process the batch may be fed to the pot in small quantities which are not sufficient to materially cool the pot and which, falling upon the surface of the partially-reduced mass within the pot, will not come in contact with the walls of the pot, and the pot being kept at this constant high temperature and the batch falling upon this highly-heated partially-reduced mass within the pot the reduction of the batch will be very rapid. It is thus seen that by means of my process I am not only enabled to save in installation, because one pot used with my process will take the place of six or eight pots used in processes which now obtain in the manufacture of high-grade glass, but since the glass is never worked out of the pot so that the pot is emptied, and the pot is never supplied with a full charge of cold batch, I avoid those extremes of expansion and contraction which, as is well known, not only tend to crack and destroy the pot, but also cause the interior surface of the pot to scale off, so that the pot quickly wears out. Again, it will be seen that by exposing the metal to the direct action of the heating medium after reduction within the closed pot I save in fuel, because the heat is thus applied directly to the surface of the metal instead of through an intervening wall. I make it possible to utilize the heat radiated from the heating-chamber to partially or wholly maintain the fluidity of the glass in the plaining and working chambers. I provide a ready means of escape for the gases which escape from the metal during the plaining stage, thus preventing any pressure within the plaining-chamber and so hastening the plaining of the glass, and I also am enabled to maintain the glass at a constant level in the working chamber, a practical advantage which will be readily recognized.

By means of my process I attain all of the advantages which are inherent in the well-known tank process for the manufacture of cheap grades of glass, and I make it possible to attain these advantages in the manufacture of the very best qualities of glass which have heretofore been made only in closed pots in the manner hereinbefore referred to. In a word, I provide a continuous process for manufacturing pot-made glass, and in so doing I not only attain the advantages of the well-known tank process, but I make possible a great saving both in the number of pots necessary for a given output and in the life of the pots used.

Obviously various changes may be made in the apparatus used without departing from the spirit of my process, the characteristic feature of which is the continuous reducing of the batch and refining of the molten glass while the batch and the metal are protected from contact with the reducing medium. The term "continuous," it will be understood, is purely a relative term, and is used to distinguish this process from any process in which the glass is necessarily reduced in distinct lots or batches instead of being reduced in such a manner that there is a continuous or intermittent feed at one point and a continuous or intermittent discharge of the resultant metal at another point.

I claim—

1. The process of manufacturing glass which comprises protecting the entire batch against contact with the reducing-gases, while subjecting the batch to a reducing temperature, and subsequently plaining the metal within a compartment in communication with the heating medium.

2. The process of manufacturing glass which comprises completely reducing the batch while protected against contact with the reducing-gases and then plaining the resultant metal while in communication with a heating medium.

3. The process of manufacturing glass which comprises reducing the batch, while protected within a pot, and causing the resultant metal to flow into a tank which is in communication with a heating medium.

4. The process of manufacturing glass which comprises continuously reducing the batch while protected within a substantially closed pot, and causing a continuous flow of the resultant metal into a tank which is in communication with a heating medium.

5. The process of manufacturing glass which comprises feeding the batch into a closed chamber, reducing the batch by means applied externally of said chamber, and discharging the resultant metal from said chamber, during said reducing stage, into a zone of lower temperature but where the metal is maintained in a sufficiently fluid state.

6. The process of manufacturing glass which comprises continuously feeding the batch into a closed chamber, reducing the batch by heat applied externally of said chamber, and continuously discharging the resultant metal from said chamber into a zone of lower temperature where the metal is maintained in a sufficiently fluid state.

7. The process of manufacturing glass which comprises reducing the batch, while in a substantially closed chamber, by heat applied externally of said chamber, conducting the resultant metal into a substantially closed plaining-chamber and thence into a receiving-tank which is in communication with a heating medium.

8. The process of manufacturing glass, which comprises continuously supplying the batch to a substantially closed chamber, reducing the same while in said chamber, conducting the resultant product into a substantially closed plaining-chamber, partially plaining the same while in said plaining-chamber, all under a reducing heat applied externally to the reducing and plaining chambers, and conducting the resultant metal into a receiving-chamber which is in communication with a heating medium.

9. The continuous process of manufacturing glass, which comprises supplying the batch to a chamber, reducing the same therein by heat applied externally of said chamber, conducting the resultant product into a plaining-chamber during the progress of said reduction, heat being applied at the same time externally of said plaining-chamber, partially plaining said product while in said plaining-chamber and causing a continuous flow of the resultant metal from the plaining-chamber into a receiving-chamber while the reduction and plaining are taking place in said reduction and plaining chambers, the metal being exposed in said receiving-chamber to the direct action of a heating medium, and being maintained in a sufficiently fluid condition within said receiving-chamber.

10. The process of manufacturing glass which comprises continuously feeding the batch into a substantially closed chamber, reducing the same in said chamber, conducting the resultant product into a substantially closed plaining-chamber, partially plaining the glass while in said plaining-chamber, all in the presence of a reducing heat applied externally of said reducing and plaining chambers, and conducting the resultant metal into a heated receiving-chamber in which the temperature is materially lower than the reducing temperature.

11. The process of manufacturing glass, which comprises continuously reducing the batch within a substantially closed pot by means of heat applied externally of said pot and causing the resultant metal to flow out of said pot and into a plaining-tank, within which a prolonged refining process takes place, while at the same time the metal is caused to continuously flow from the lower portion of said plaining-tank into a working chamber from which the refined glass is worked.

12. The process of manufacturing glass, which comprises supplying the batch to a substantially closed chamber, partially reducing the same within said chamber, conducting the resultant product into a substantially closed plaining-chamber, further reducing and partially plaining the same while in said plaining-chamber, all by means of a reducing heat applied externally of said reducing and plaining chambers, conducting the resultant metal into a receiving-tank, subjecting the metal to a prolonged plaining stage while in said tank and under the influence of a high temperature, and causing a continuous flow of metal from the lower portion of said tank into a working tank, from which the refined metal is worked.

SOLON OSMOND RICHARDSON, JR.

Witnesses:
C. C. OSWALD,
J. H. WRIGHT.